United States Patent
Tsai et al.

(10) Patent No.: US 6,816,612 B2
(45) Date of Patent: Nov. 9, 2004

(54) MULTI-MODE IMAGE PROCESSING METHOD AND A SYSTEM THEREOF

(75) Inventors: Jewel Tsai, Hsinchu (TW); Nora Wen, Hsinchu Hsien (TW)

(73) Assignee: Mustek Systems Inc., Hsinchu (TW)

( * ) Notice: Subject to any disclaimer, the term of this patent is extended or adjusted under 35 U.S.C. 154(b) by 621 days.

(21) Appl. No.: 09/893,449

(22) Filed: Jun. 29, 2001

(65) Prior Publication Data

US 2003/0002733 A1 Jan. 2, 2003

(51) Int. Cl.$^7$ .............................. G06K 9/00; G06K 9/62
(52) U.S. Cl. ...................................... 382/165; 382/225
(58) Field of Search .................................. 382/162, 165, 382/167, 203, 224, 225, 298, 299, 305; 358/1.13, 1.15, 1.16, 3.06, 3.1, 3.2, 1.9, 501; 348/174, 207

(56) References Cited

U.S. PATENT DOCUMENTS

| | | | | |
|---|---|---|---|---|
| 5,278,670 A | * | 1/1994 | Eschbach | 358/453 |
| 5,550,569 A | * | 8/1996 | Wright | 347/15 |
| 5,956,470 A | * | 9/1999 | Eschbach | 358/1.9 |
| 6,173,075 B1 | * | 1/2001 | Collins | 382/203 |
| 6,178,011 B1 | * | 1/2001 | Lin et al. | 358/1.9 |
| 6,236,466 B1 | * | 5/2001 | Chung | 358/1.9 |
| 6,437,872 B1 | * | 8/2002 | Davidson et al. | 358/1.15 |
| 6,556,311 B1 | * | 4/2003 | Benear et al. | 358/1.9 |
| 6,678,426 B1 | * | 1/2004 | Bearss et al. | 382/299 |

* cited by examiner

Primary Examiner—Andrew W. Johns
Assistant Examiner—Amir Alavi
(74) Attorney, Agent, or Firm—Birch, Stewart, Kolasch & Birch, LLP

(57) ABSTRACT

This specification discloses a multi-mode image processing method and the corresponding system. Multiple modes, including line art, gray level, and colors, are used to capture and store image information. An image capture device is used to capture a preliminary color image. An image analyzing device divides the preliminary color image into line art image areas, gray-level image areas, and color image areas. The image capture device captures an advanced line art image, an advanced gray-level image, and an advanced color image. Users can select the line art image areas, the gray-level image areas, and the color image areas in order to obtain the advanced line art image, the advanced gray-level image, and the advanced color image, respectively. An image storage device stores the multi-mode image information into a multi-mode image file.

16 Claims, 9 Drawing Sheets

MULTI-MODE IMAGE PROCESSING METHOD AND A SYSTEM THEREOF

BACKGROUND OF THE INVENTION

1. Field of Invention

The invention relates to a multi-mode image processing method and its corresponding system that can be applied to line art, gray-level and colors image processing.

2. Related Art

A normal electronic graphics file is comprised of pixels. An image file is displayed by thousands up to millions of arrayed pixels. Computers use one of several bits of data combinations to record the brightness and colors of each pixel. The more bits there are in image data, the more stored information there is in the file, which of course occupies a lot of memory. Images according to their storage methods can be classified into three basic types: line art images, gray-level images and colors images.

For line art images, each pixel is recorded using one bit, indicating whether the pixel is black or white. This type of images is usually used in OCR (Optical Calligraphy Recognition). Halftone images use black-and-white images to generate an approximate effect to the gray-level images. In this case, a darker area contains more black dots, while a brighter area contains less. Therefore, images with different gray levels can be produced in this way. Most of the pictures seen in newspapers belong to this type of halftone images.

Each pixel in a gray-level image takes more bits. For example, 4 bits are needed to present 16 gray levels. Similarly, 8 bits can represent 256 gray levels so that the black-and-white pictures become more realistic.

Colors images contain more complicated data than line art and gray-level images. To obtain colors images, digital cameras and scanners split colors in an image (e.g., RGB colors) to analyze the light received from an object. Through this operation, all colors in the image can be reproduced by mixing the RGB colors in different proportions. As the selected modes differ, the color-recording limit can be 24-bit, 30-bit or even 36-bit RGB pixels.

In practice, a single object often contains more than one image feature. For example, a newspaper contains line art images for texts, gray-level images for classified ads, and colors images for pictures. The photo part of a driver ID is a colors image, while the other parts are either line art or gray-level images. When making name cards, one often needs to simultaneously process the colors images for photo pictures, line art images for texts and gray-level images for trademarks.

There are several processing methods in the prior art: one is to process everything in colors images. One merit is that there is a lot of information for the image so that it can mimic the true image. Nevertheless, the drawback is that it needs a huge amount of memory and requires along processing time. A second method is to process in line art or gray-level images. One advantage of this is that it requires less memory and a shorter processing time. But the drawback is that one loses some image information and the image cannot be truly reproduced.

SUMMARY OF THE INVENTION

In view of the foregoing, the invention provides a multi-mode image processing method and its system. It uses line art, gray-level, and colors multiple modes to capture, edit and store image information.

The invention uses an image capture device to capture a preliminary colors image. An image analyzing device separates the preliminary colors image into line art image areas, gray-level image areas, and colors image areas. The image capture device captures an advanced line art image, an advanced gray-level image, and an advanced colors image. Users can obtain the advanced line art image, the advanced gray-level image, and the advanced colors image by selecting the line art image areas, the gray-level image areas, and the colors image areas, respectively, from the existing image shown by an image display device. An image storage device stores the multi-mode image information in a multi-mode image file.

The disclosed multi-mode image capture and storage method includes the steps of: capturing a preliminary image, analyzing image information, capturing an advanced image, and storing image information.

The disclosed multi-mode image editing and storage method includes the steps of: capturing an existing image, displaying a preliminary image, editing image information, and storing image information.

The disclosed multi-mode image editing and storing system includes: an image display device, an input device, and an image storage device.

An object of the invention is to use line art, gray-level, and colors multiple modes to capture, edit, and store image information.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
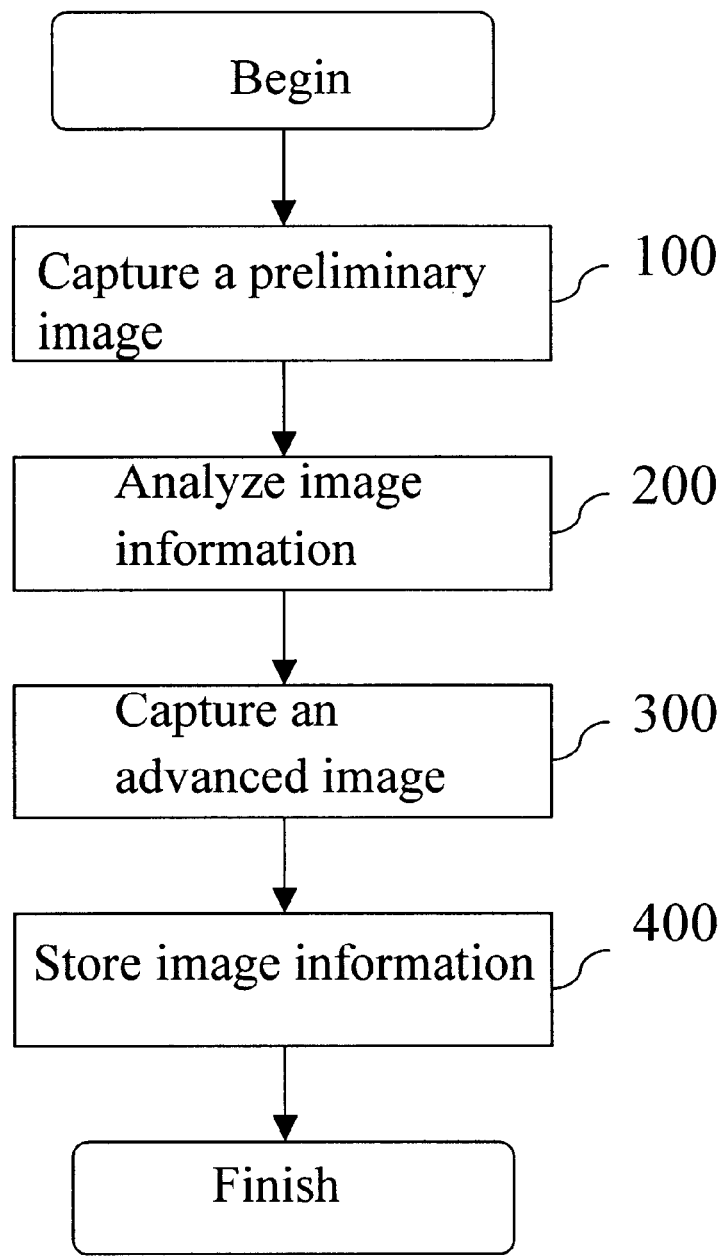
FIG. 1 is a flowchart of the multi-mode image capture and storage method of the invention.

With reference to FIG. 1, the multi-mode image capturing and storage method of the invention uses line art, gray-level, and colors multiple modes to capture and store image information of an object. It includes the steps of: capturing a preliminary image 100, analyzing image information 200, capturing an advanced image 300, and storing image information 400.

The step of capturing a preliminary image 100 captures a preliminary colors image of the object using an image capture device. This step captures the preliminary colors image with a low solution between 60 dpi and 300 dpi.

The step of analyzing image information 200 uses an image analyzing device to separate the preliminary colors image into line art image areas, gray-level image areas, and colors image areas.

The step of capturing an advanced image 300 captures an advanced line art image, an advanced gray-level image, and an advanced colors image according to the line art image areas, the gray-level image areas, and the colors image area using the image capture device. The advanced images are captured at a high resolution between 300 dpi and 2400 dpi.

The step of storing image information 400 stores the advanced line art image, the advanced gray-level image, and the advanced colors image into a multi-mode image file using the image storage device.

Figure 2:
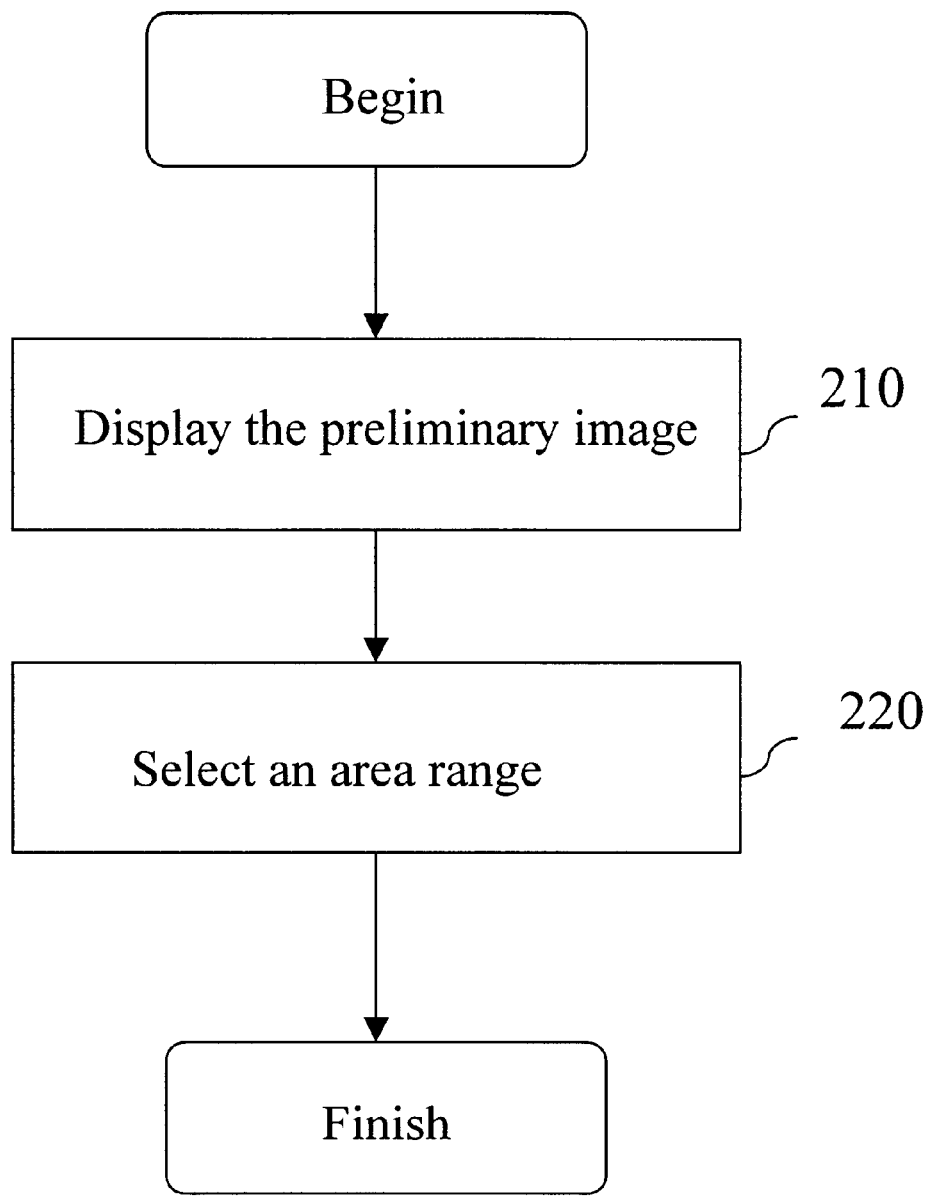
FIG. 2 is a flowchart of a first embodiment of the image information analyzing step of FIG. 1.

With reference to FIG. 2, a first embodiment of step 200 includes the steps of displaying a preliminary image 210 and selecting an area 220. Step 210 uses an image display device to display the preliminary colors image. Step 220 allows a user to select line art image areas, gray-level image areas, and colors image areas on the image display device using an input means.

Figure 3:
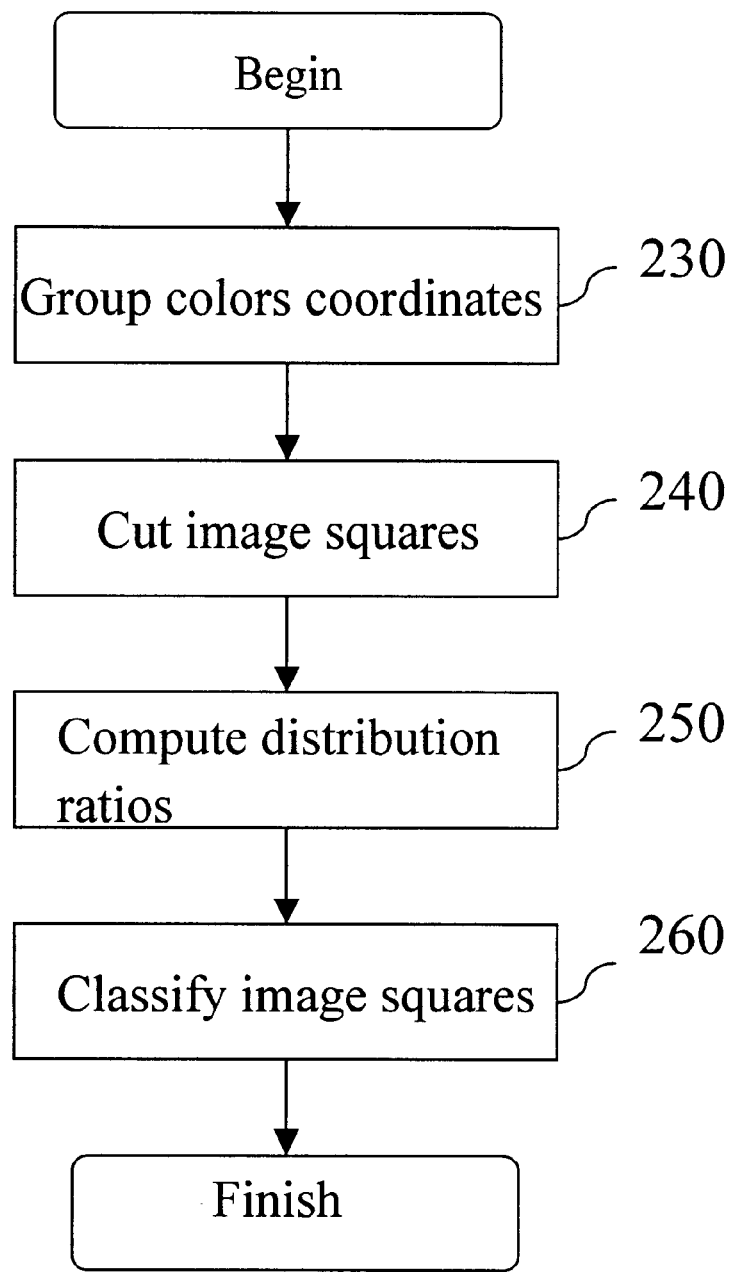
FIG. 3 is a flowchart of a second embodiment of the image information analyzing step of FIG. 1.

Referring to FIG. 3, a second embodiment of step 200 includes the steps of grouping colors coordinates 230, cutting image squares 240, computing distribution ratios 250, and classifying image squares 260. Step 230 separates a colors coordinate into line art space, gray-level space and colors space. Step 240 cuts the preliminary colors image into several image squares in an orthogonal way. Step 250 computes the distribution ratios of the pixels in the line art space, the gray-level space and the colors space for each image square. Step 260 classifies each image square as line are image areas, gray-level image areas, and colors image areas according to the distribution ratios of the pixels in the line art space, the gray-level space and the colors space for each image square.

Figure 4:
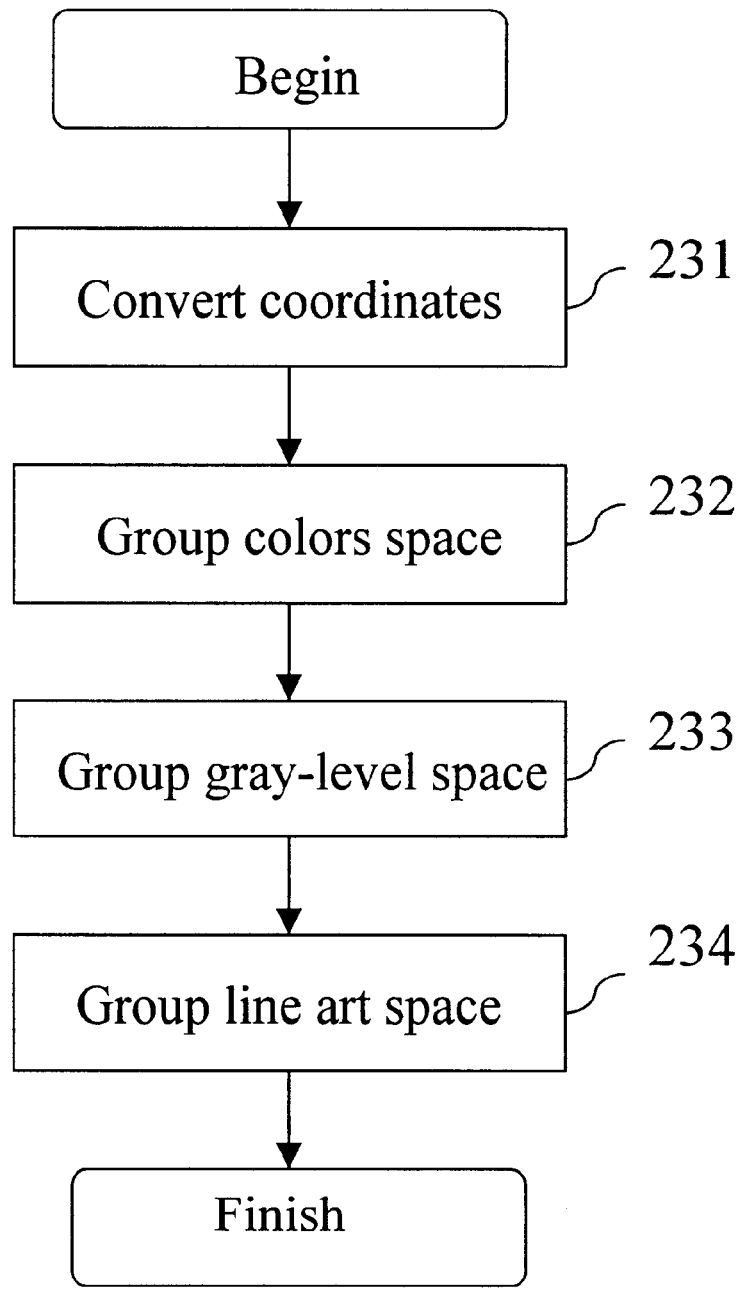
FIG. 4 is a flowchart of grouping colors coordinates.

As shown in FIG. 4, step 230 includes the steps of: converting each of in the colors coordinates into CIE Lab coordinates (L,a,b) in step 231, grouping points whose colors coordinates satisfy the condition that $a^2+b^2$ is equal to or greater than a colors threshold value into colors space in step 232, grouping points whose colors coordinates satisfy the conditions that $a^2+b^2$ is smaller than the colors threshold value and L is between a white threshold value and a black threshold value into gray-level space 233, and grouping other points into line art space 234.

Figure 5:
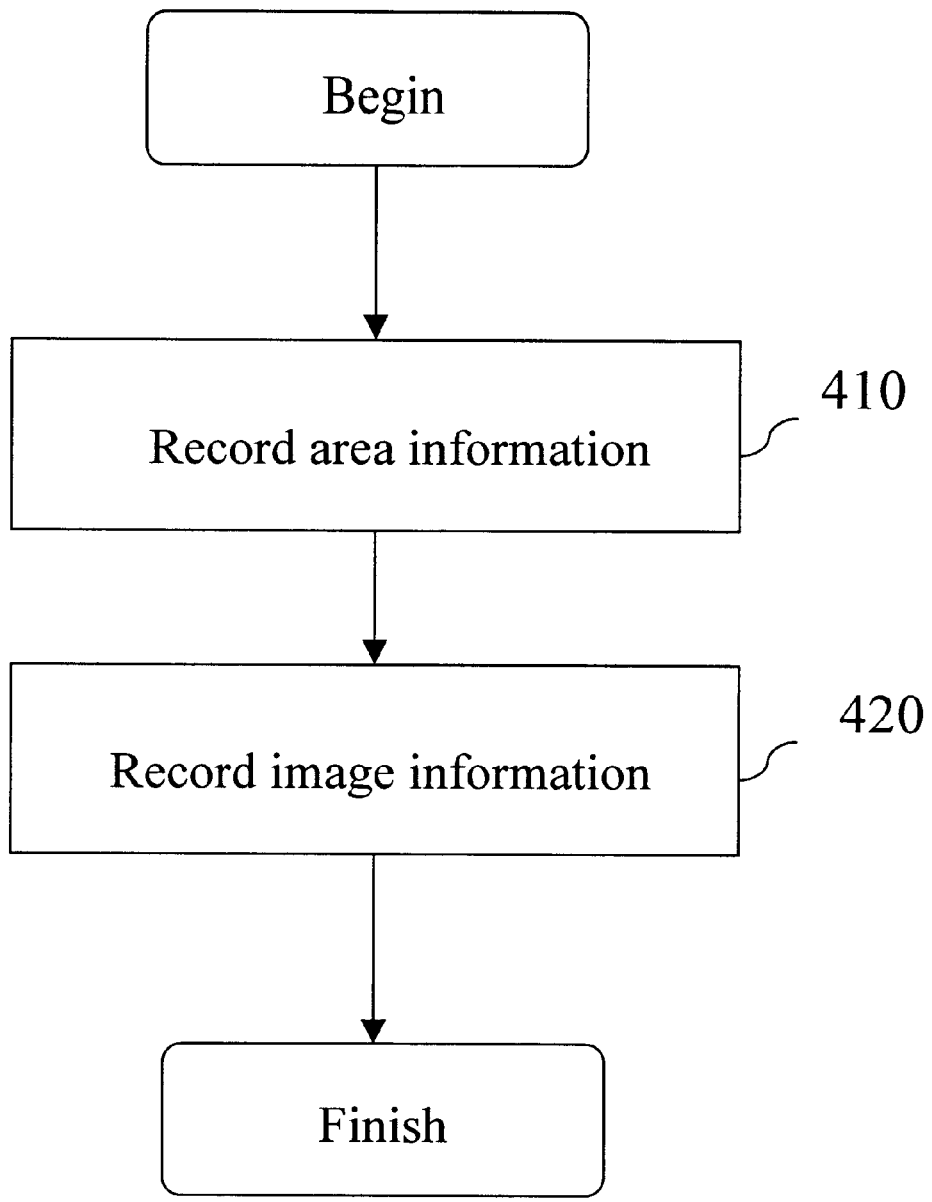
FIG. 5 is a flowchart of storing image information.

Referring to FIG. 5, step 400 includes the steps of recording area information 410 and recording image information 420. Step 410 records the coordinates of the line art image areas, the gray-level image areas, and the colors image areas. Step 420 records the advanced line art image, the advanced gray-level image, and the advanced colors image.

Figure 6:
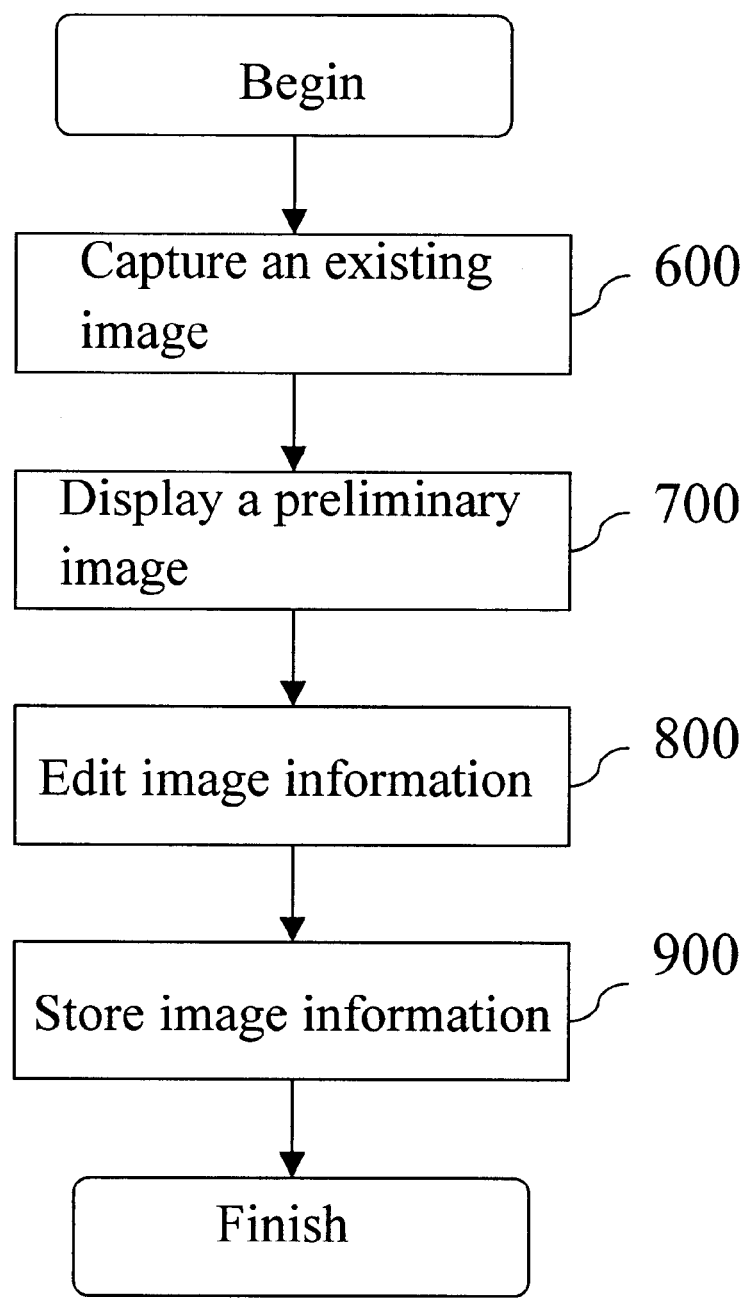
FIG. 6 is a flowchart of the disclosed multi-mode image editing and storage method.

With reference to FIG. 6, the invention also discloses a multi-mode image editing and storage method, which reads in an existing image file for editing and stores the edited file in line art, gray-level, and colors multiple modes. It includes the steps of: capturing an existing image 600, displaying a preliminary image 700, editing image information 800, and storing image information 900.

Step 600 reads in at least one existing image from an image storage device. Step 700 uses an image display device to show the existing image. Step 800 allows a user to select the line art image areas, the gray-level image areas, and the colors image areas from the existing image shown on the image display device using an input device to obtain the advanced line art image, the advanced gray-level image, and the advanced colors image, respectively. Step 900 stores the advanced line art image, the advanced gray-level image, and the advanced colors image into a multi-mode image file in an image storage device.

Figure 7:
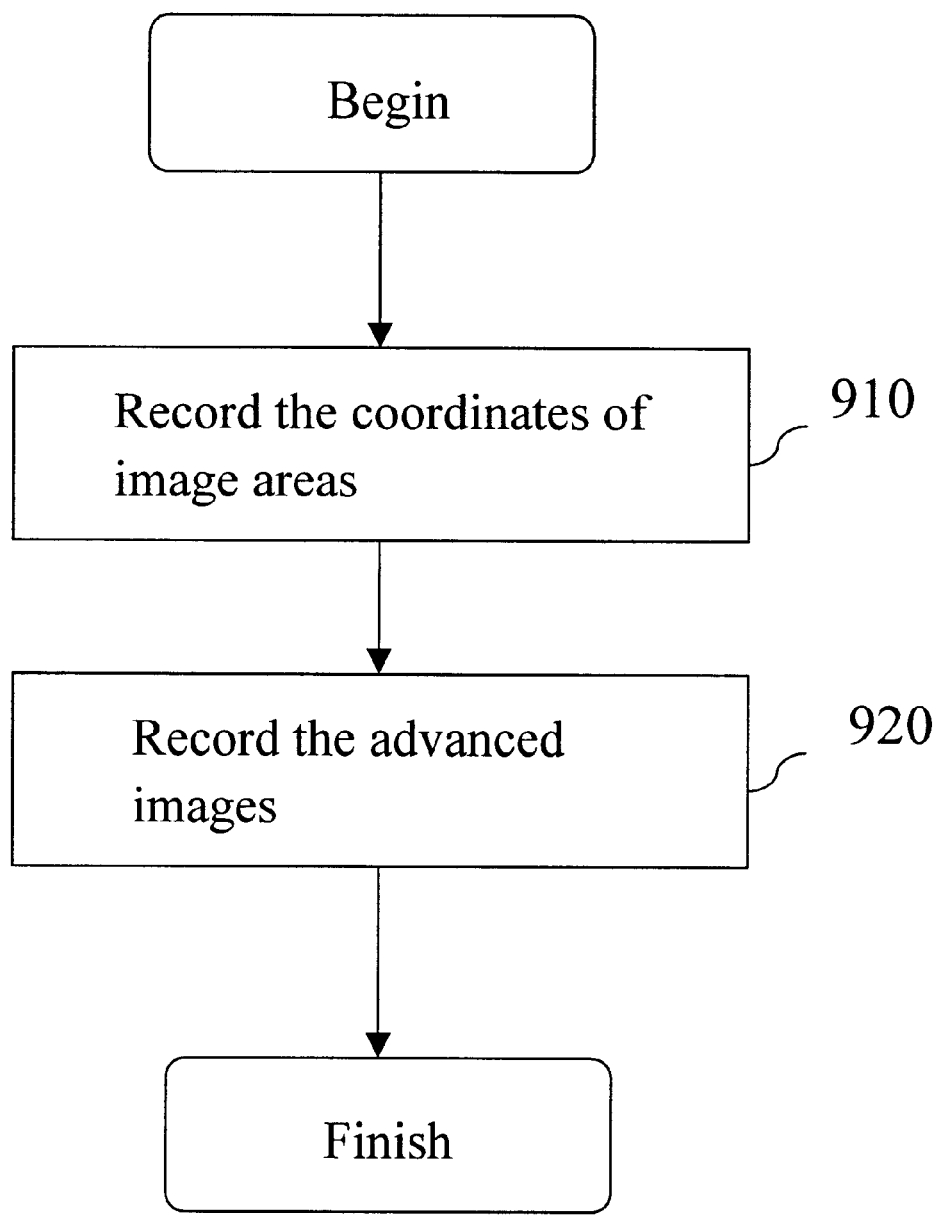
FIG. 7 is a flowchart of storing image information.

As shown in FIG. 7, step 900 includes the steps of recording area information 910 and recording image information 920. Step 910 records the coordinates of the line art image areas, the gray-level image areas, and the colors image areas. Step 920 records the advanced line art image, the advanced gray-level image, and the advanced colors image.

Figure 8:
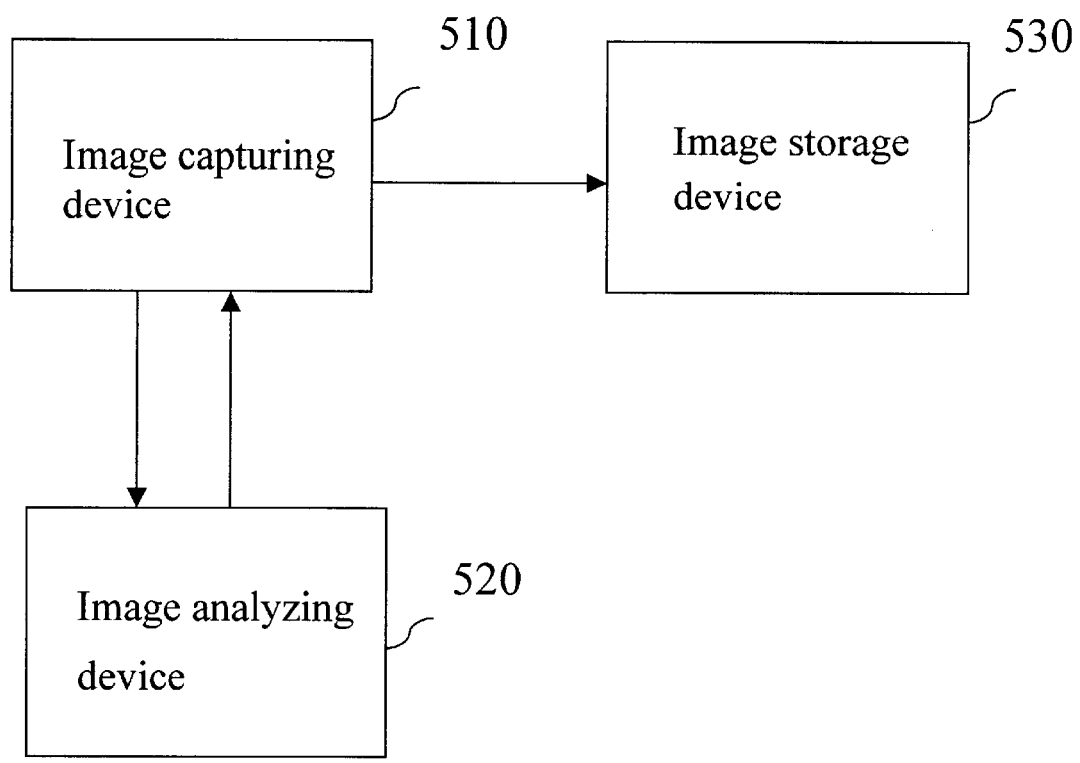
FIG. 8 shows a block diagram of the disclosed multi-mode image capturing and storage system.

With reference to FIG. 8, the invention also discloses a multi=mode image capture and storage system, which uses line art, gray-level, and colors multiple modes to capture and store the image information of an object. The system includes an image capture device 510, an image analyzing device 520, and an image storage device 530.

The image capture device 510 captures a preliminary colors image of the object and extracts an advanced line art image, an advanced gray-level image, and an advanced colors image of the object according to line art image areas, gray-level image areas, and colors image areas. The image capture device 510 uses a low resolution between 60 dpi and 300 dpi to obtain the preliminary colors image and uses a high resolution between 300 dpi and 2400 dpi to obtain the advanced line art image, the advanced gray-level image, and the advanced colors image. The image analyzing device 520 connects to the image capture device 510 to distinguish the preliminary colors image into line art image areas, gray-level image areas, and colors image areas. A first embodiment of the image analyzing device 520 includes an image display device and an input device. The image display device displays the preliminary colors image. The input device allows a user to select the line art image areas, the gray-level image areas, and the colors image areas on the image display device.

A second embodiment of the image analyzing device 520 includes a colors coordinate table, an image cutting unit, a computing unit, and a classification unit. The colors coordinate table lists all possibilities of colors coordinates and groups them into line art space, gray-level space, and colors space. They are obtained according to the following procedure:

1. Convert each point in the colors coordinate into CIE Lab coordinate (L,a,b).
2. Group points with colors coordinates satisfying the condition that $a^2+b^2$ is greater than or equal to a color threshold value into the colors space.
3. Group points with colors coordinates satisfying the conditions that $a^2+b^2$ is smaller than a color threshold value and L is between a white threshold value and a black threshold value into the gray-level space.
4. Group the other points into the line art space.

The image cutting unit cuts the preliminary colors image into several image squares. The computing unit computes the distribution ratios of the pixels in the line art space, the gray-level space, and the colors space for each image square. The classification unit connects to the computing unit to classify each image square into line art image areas. gray-level image areas, and colors image areas in accordance with the distribution ratios of the pixels in the line art space, the gray-level space, and the colors space for each image square.

The image storage device 530 connects to the image capture device 510 to store the advanced line art image, the advanced gray-level image, and the advanced colors image into a multi-mode image file. The multi-mode image file records the coordinates of the line art image areas, the gray-level image areas, and the color image areas, and the advanced line art image, the advanced gray-level image, and the advanced colors image.

Figure 9:
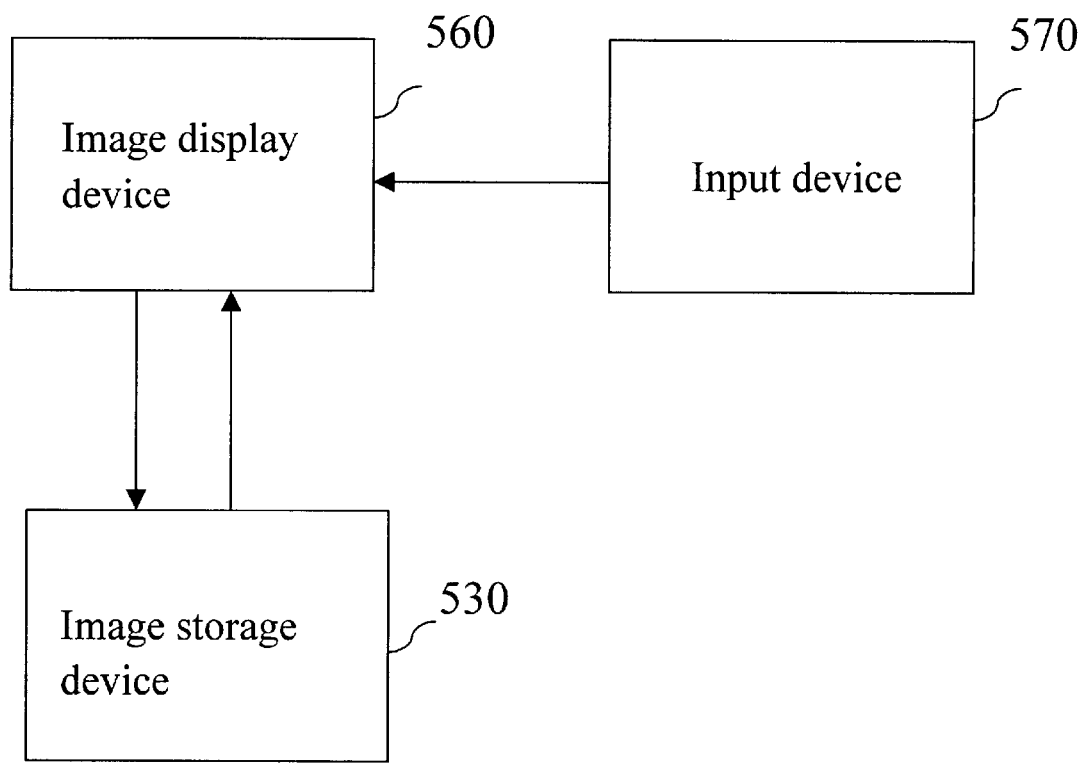
FIG. 9 shows a block diagram of the disclosed multi-mode image editing and storage system.

FIG. 9 shows a block diagram of the disclosed multi-mode image editing and storage system. The system reads in at least one existing image file to edit and stores it in the line art, gray-level, and colors multiple modes. It includes an image display device 560, an input device 570, and an image storage device 530.

The image display device 560 displays existing images. The input device 570 allows a user to select the line art image areas, the gray-level image areas, and the colors image areas from an existing image shown by the image display device 560 so as to obtain the advanced line art image, the advanced gray-level image, and the advanced colors image. The image storage device 530 reads in an existing image and stores the advanced line art image, the advanced gray-level image, and the advanced colors image into a multi-mode image file. The multi-mode image file stores the coordinates of the line art image areas, the gray-level image areas, and the colors image areas and the advanced line art image, the advanced gray-level image, and the advanced colors image Effects of the Invention The invention discloses a method and a system of image processing in multiple modes. Image information is captured, edited and stored in line art, gray-level and colors multiple modes.

Since the invention uses multiple modes to capture and store line art images, gray-level images, and colors images. Unnecessary image information can be skipped without employing any compression means. The memory needed is not too large and the image processing can speed up. As a single multi-mode image file is used to store all image information, one is free from losing any part of the information.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A multi-mode image processing method capturing and storing image information of an object in line art, gray-level and colors multiple modes, which comprises the steps of:

capturing a preliminary image, in which an image capturing device is used to capture a preliminary colors image of the object;

analyzing image information, in which an image analyzing device is used to group the preliminary colors image into line art image areas, gray-level image areas, and colors image areas;

capturing an advanced image, in which the image capturing device obtains an advanced line art image, an advanced gray-level image, and an advanced colors image of the object according to the line art image areas, the gray-level image areas, and the colors image areas; and storing image information, in which an image storage device stores the advanced line art image, the advanced gray-level image, and the advanced colors image in a multi-mode image file.

2. The method of claim 1, wherein the step of capturing a preliminary image uses a low resolution between 60 dpi and 300 dpi to capture the preliminary colors image.

3. The method of claim 1, wherein the step of analyzing image information further includes the steps of:

displaying the preliminary image, in which an image display device is used to display the preliminary colors image; and selecting an area range, in which the user uses an input device to select the line art image areas, the gray-level image areas, and the colors image areas on the image display device.

4. The method of claim 1, wherein the step of analyzing image information further includes the steps of:

grouping colors coordinates, in which colors coordinates are grouped into line art space, gray-level space and colors space;

cutting image squares, in which the preliminary colors image is cut into a plurality of image squares horizontally and vertically;

computing distribution ratios, in which the distribution ratios of pixels in the line art space, the gray-level space and the colors space are computed for each image square; and classifying the image squares, in which each of the image squares are classified into the line art image areas, the gray-level image areas, and the colors image areas according to the distribution ratios of pixels in the line art space, the gray-level space and the colors space.

5. The method of claim 4, where the step of grouping colors coordinates further includes the steps of:

converting the colors coordinates into CIE Lab coordinates (L,a,b);

grouping the point satisfying the condition that $a^2+b^2$ is greater than or equal to a colors threshold value into the colors space;

grouping the point satisfying the conditions that $a^2+b^2$ is smaller than the colors threshold value and L is between a white threshold value and a black threshold value into the gray-level space; and grouping the other points into the line art space.

6. The method of claim 1, wherein the step of capturing an advanced image uses a high resolution between 300 dpi and 2400 dpi to capture the advanced line art image, the advanced gray-level image and the advanced colors image.

7. The method of claim 1, wherein the step of storing image information further includes the steps of:

recording area image information, in which the coordinates of the line art image areas, the gray-level image areas, and the colors image areas are recorded; and recording image information, in which the advanced line art image, the advanced gray-level image, and the advanced colors image are recorded.

8. A multi-mode image processing system capturing and storing image information of an object in line art, gray-level and colors multiple modes, which comprises:

an image capturing device, which captures a preliminary colors image of the object and captures an advanced line art image, an advanced gray-level image, an advanced colors image according to line art image areas, gray-level image areas, and colors image areas;

an image analyzing device, which connects to the image capturing device and group the preliminary colors image into the line art image areas, the gray-level image areas, and the colors image areas; and an image storage device, which connects to the image capturing device to store the advanced line art image, the advanced gray-level image, and the advanced colors image in a multi-mode image file.

9. The system of claim 8, wherein the image capturing device uses a low resolution between 60 dpi and 300 dpi to capture the preliminary colors image.

10. The system of claim 8, wherein the image capturing device uses a high resolution between 300 dpi and 2400 dpi to capture the advanced line art image, the advanced gray-level image, and the advanced colors image.

11. The system of claim 8, wherein the image analyzing device comprises:
   an image display device, which displays the preliminary colors image; and
   an input device, which allows the user to select the line art image areas, the gray-level image areas, and the colors image areas from the preliminary colors image shown on the image display device.

12. The system of claim 8, wherein the image analyzing device comprises:
   a colors coordinate table, which lists all possibilities of color coordinates and groups the colors coordinates into line art space, gray-level space, and colors space;
   an image cutting unit, which cuts the preliminary colors image into a plurality of image squares;
   a computing unit, which computes the distribution ratios of the pixels in the line art space, the gray-level space, and the colors space for each of the image squares according to the colors coordinate table; and
   a classifying unit, which connects to the computing unit and classifies each of the image squares into the line art image areas, the gray-level image areas, and the colors image areas according to the distribution ratios of the pixels contained in the image square in the line art space, the gray-level space, and the colors space.

13. The system of claim 12, where the colors coordinate table is obtained through the steps of:
   converting the colors coordinates into CIE Lab coordinates (L,a,b);
   grouping the point satisfying the condition that $a^2+b^2$ is greater than or equal to a colors threshold value into the colors space;
   grouping the point satisfying the conditions that $a^2+b^2$ is smaller than the colors threshold value and L is between a white threshold value and a black threshold value into the gray-level space; and
   grouping the other points into the line art space.

14. The system of claim 8, wherein the multi-mode image file records the coordinates of the line art image areas, the gray-level image areas, and the colors image areas, and the advanced line art image, the advanced gray-level image, and the advanced colors image.

15. A multi-mode image processing system reading in at least one existing image file for editing and storing the edited image file in line art, gray-level and colors multiple modes, which comprises:
   an image display device, which displays at least one existing image;
   an input device, which allows a user to select line art image areas, gray-level image areas, colors image areas from the existing image shown in the image display device to obtain an advanced line art image, an advanced gray-level image, and an advanced colors image; and
   an image storage device, which the existing image file is read from and stores the advanced line art image, the advanced gray-level image, and the advanced colors image in a multi-mode image file.

16. The system of claim 15, wherein the multi-mode image file stores the coordinates of the line art image areas, the gray-level image areas, and the colors image areas, and the advanced line art image, the advanced gray-level image, and the advanced colors image.

* * * * *